May 8, 1962 R. T. EVANS 3,033,934

TRUNK ROUTING

Filed Feb. 26, 1959 7 Sheets-Sheet 1

INVENTOR.
Robert T. Evans
BY C. R. Sipe
Atty.

May 8, 1962

R. T. EVANS 3,033,934

TRUNK ROUTING

Filed Feb. 26, 1959

7 Sheets-Sheet 2

INVENTOR.
Robert T. Evans
BY C. R. Sipe
Atty.

INVENTOR.
Robert T. Evans
BY C. R. Sipe
Atty.

INVENTOR.
Robert T. Evans
BY C. R. Sipe
Atty.

INVENTOR.
Robert T. Evans
BY C. R. Sipe
Atty.

TRUNK ROUTING

Filed Feb. 26, 1959 7 Sheets-Sheet 6

INVENTOR.
Robert T. Evans
BY C. R. Sipe
Atty.

May 8, 1962 R. T. EVANS 3,033,934

TRUNK ROUTING

Filed Feb. 26, 1959 7 Sheets-Sheet 7

INVENTOR.
Robert T. Evans
BY C. R. Sipe
Atty.

United States Patent Office 3,033,934

Patented May 8, 1962

3,033,934

TRUNK ROUTING

Robert T. Evans, Oak Park, Ill., assignor to Automatic Electric Laboratories, Inc., a corporation of Delaware Filed Feb. 26, 1959, Ser. No. 795,784
6 Claims. (Cl. 179—18)

This invention relates to telephone systems and more particularly to trunking systems utilizing alternate tandem trunking between the exchanges of an automatic telephone network.

The main object of the present invention is the provision of a simplified sender circuit for use with alternate trunks which are employed only when all the trunks in the direct route are busy.

Another object of the invention is to provide a simplified sender which utilizes the normal storage of the digit input system and provides merely the translation of required digits in providing the alternate trunk routes.

A further object of the invention relates to the absorption of digits in the sender under the direction of the seizing trunk route.

A still further object of the invention relates to the translation of transmitted digits into additional digits which may be required by the receiving exchange.

A feature of the invention consists of the absorption of digits by means of pulsing a trunk relay, thereby counting the digits to be absorbed and switching all subsequent digits through to the called exchange.

The invention shown herein constitutes an improvement over a system of the type shown in U.S. 2,857,467 issued October 21, 1958, to I. Molnar. In the cited patent an alternate trunking arrangement having overflow routes is also shown. When an overflow route is to be used in the Molnar system, a routing trunk is seized. The trunk then transmits a momentary stop-dial signal to the seizing equipment while the trunk is finding an idle register-sender. After the seizure of the register-sender, this signal is removed and digital information is transmitted to the register-sender. The information is then stored in the register-sender and translated and re-transmitted as required.

In the present invention, a trunk sender is provided in place of the previously mentioned register-sender. The trunk, in this instance, also transmits a stop-dial signal to the seizing equipment. This stop-dial condition is maintained while required routing digits are initiated and transmitted from the sender. When the trunk sender completes the transmission of the required code routing digits, the stop-dial condition is removed, the trunk sender removes itself from the circuit, and the digits stored in the primary storage equipment are transmitted directly through the seized trunk to the alternate route.

Further, in a system as described above, digits transmitted from storage may be deleted as indicated by the route over which the trunk is seized. The digits to be deleted or absorbed are counted by a relay in the trunk sender and when the required number of digits are deleted, all further digits are transmitted directly to the called exchange.

Figure 1:
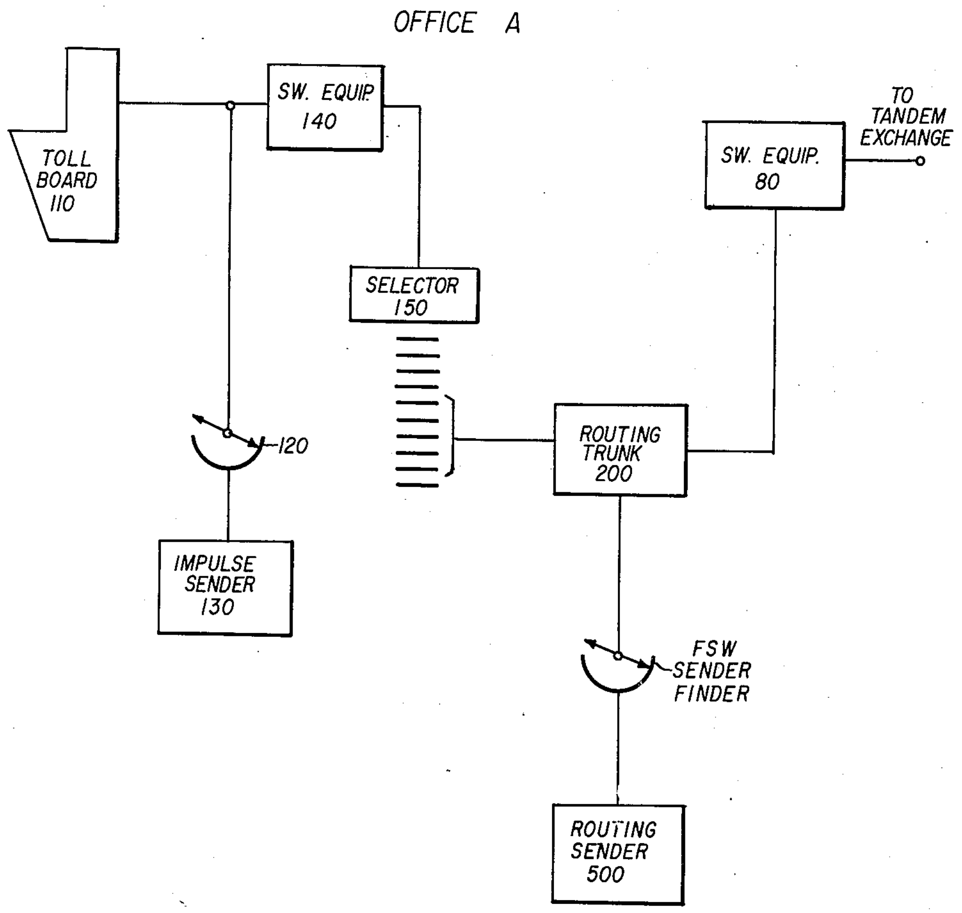
Figure 8:
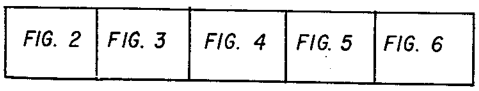
Figure 2:
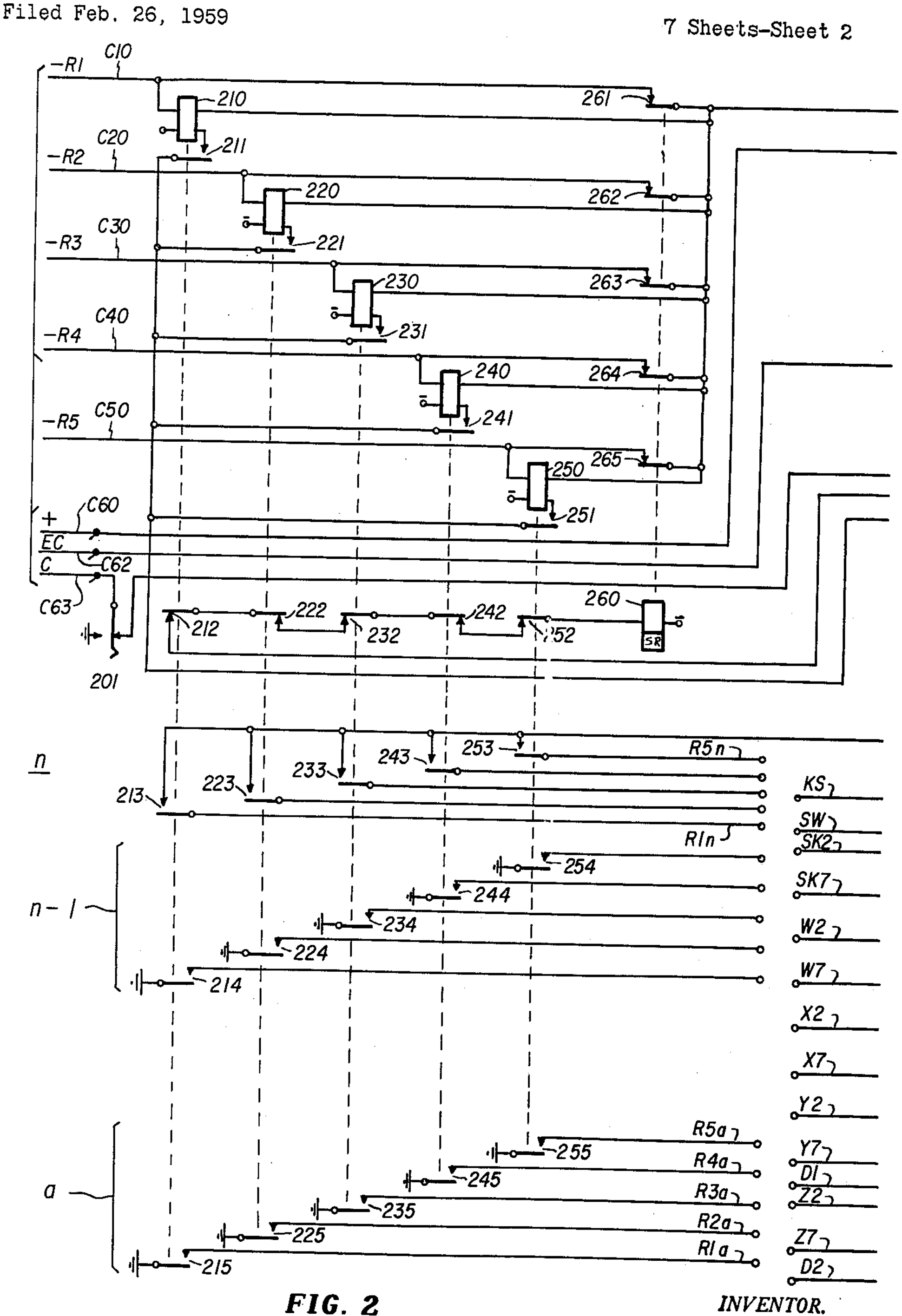
Figure 3:
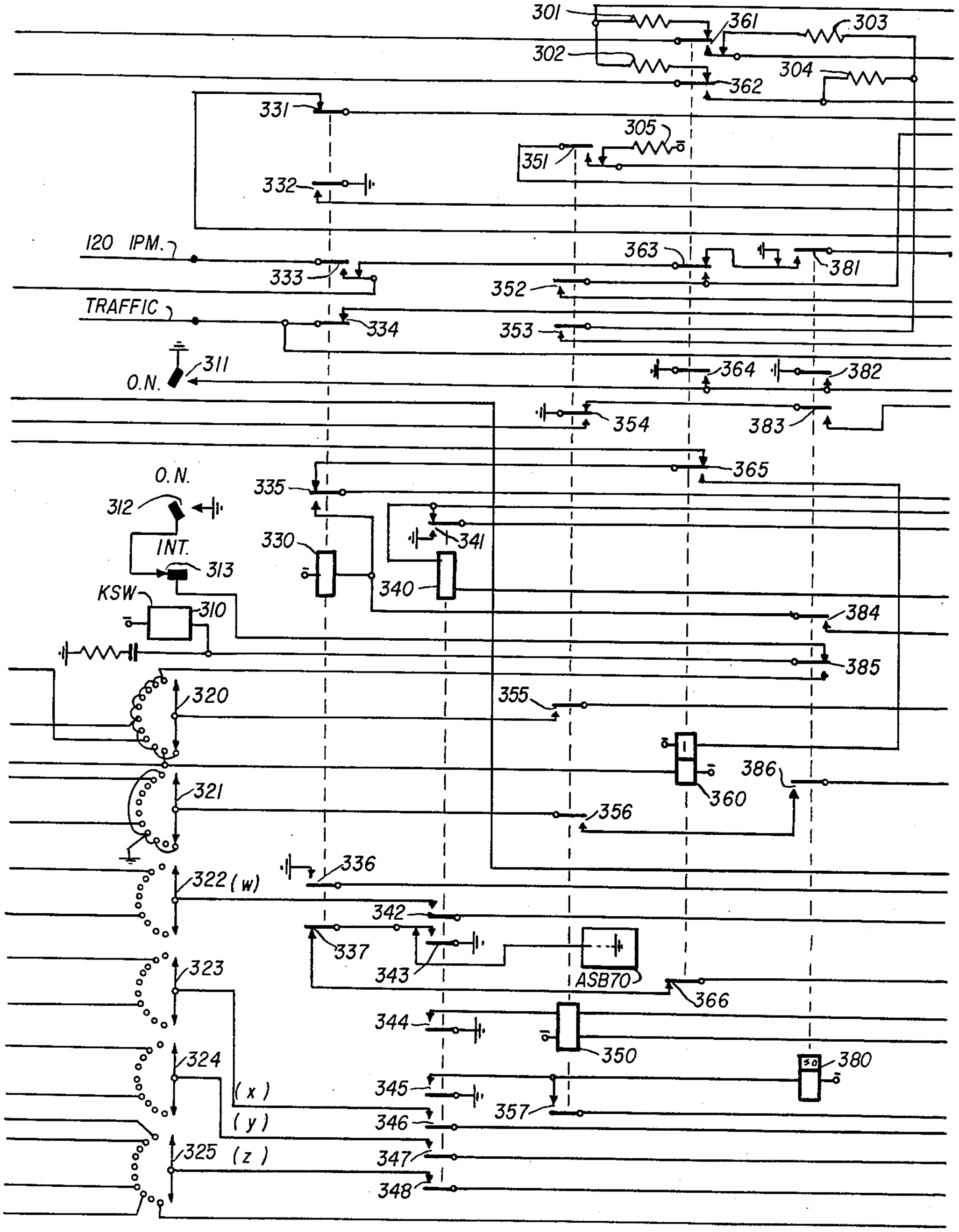
Figure 4:
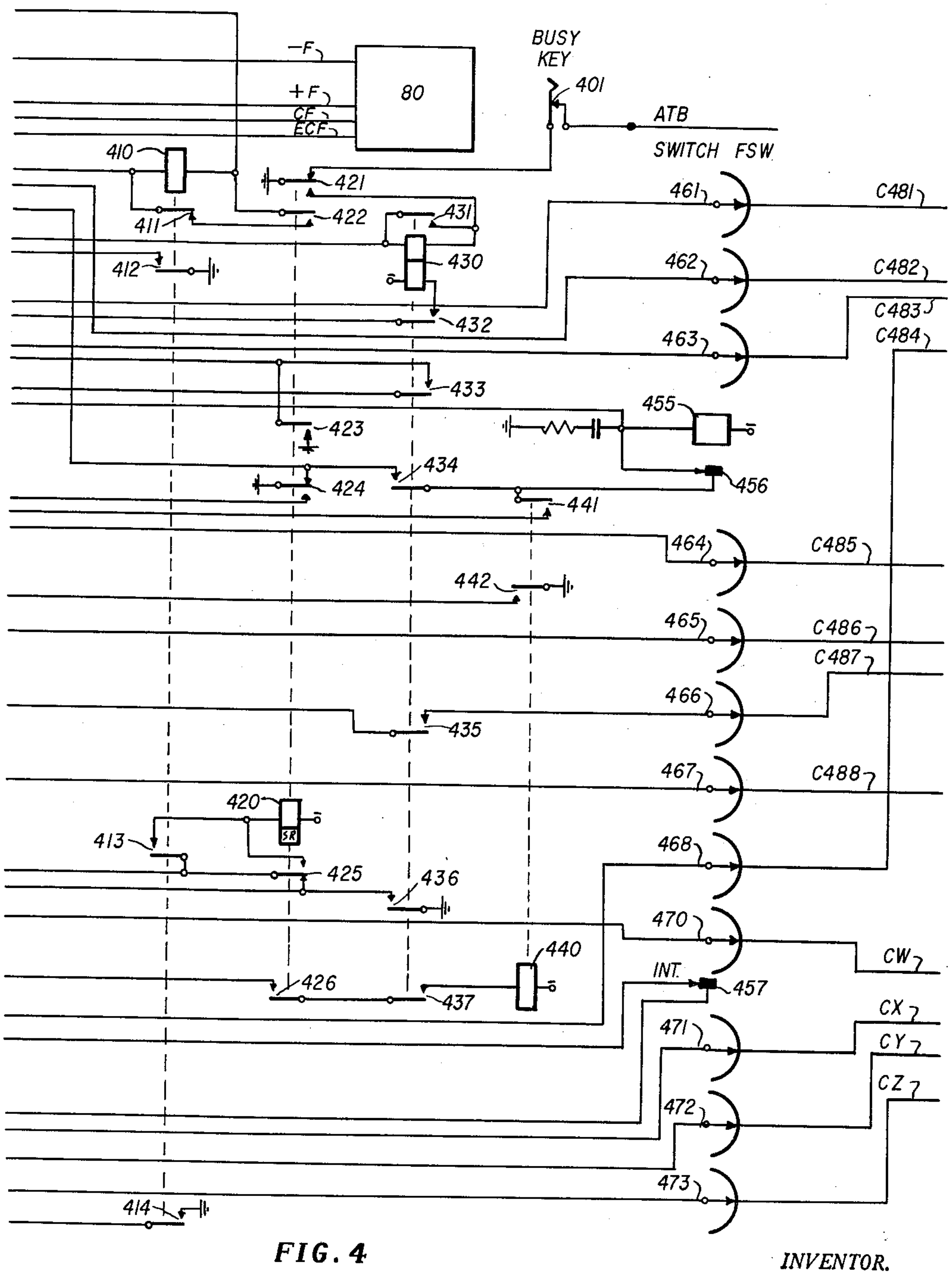
Figure 5:
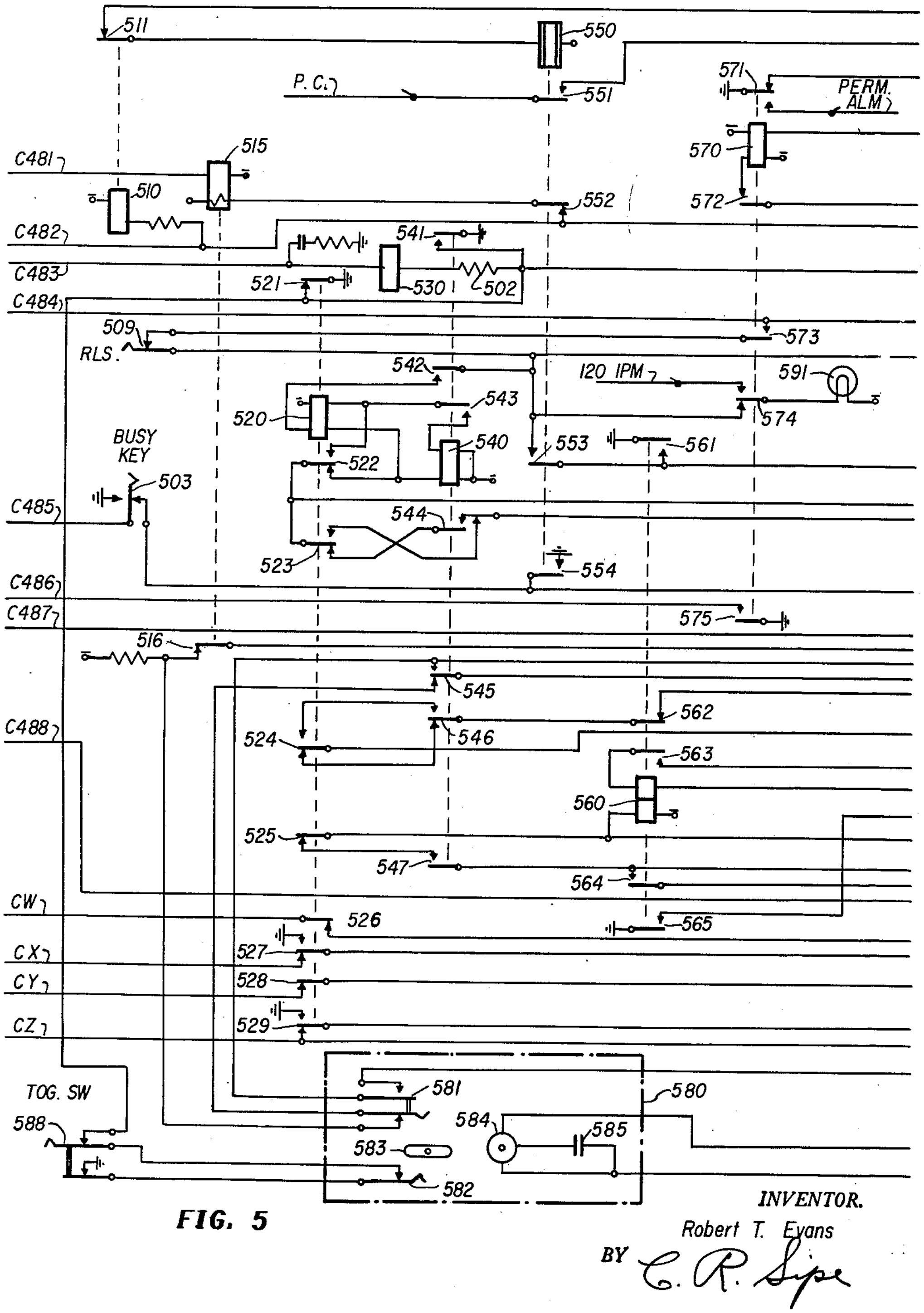
Figure 6:
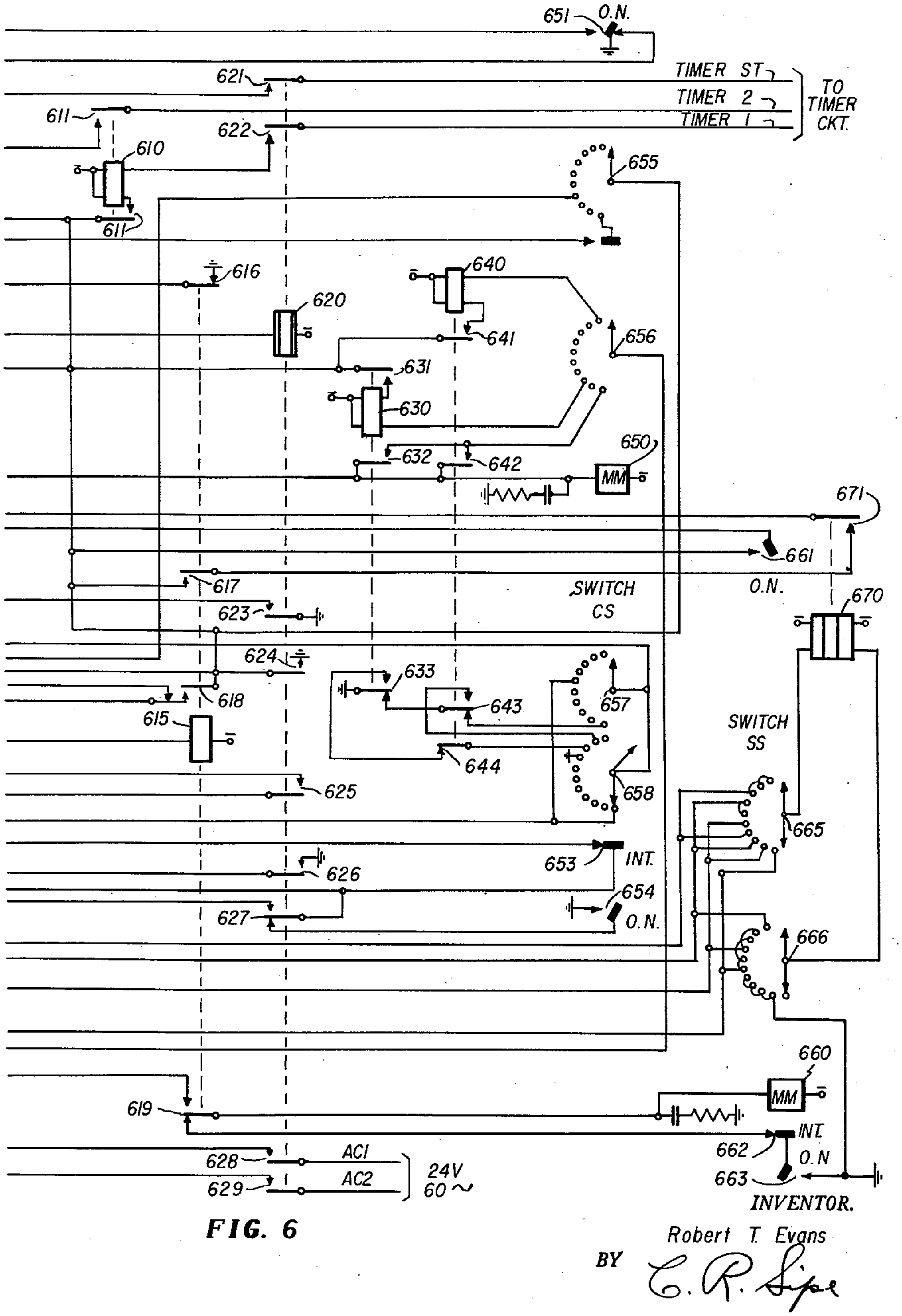
Figure 7:
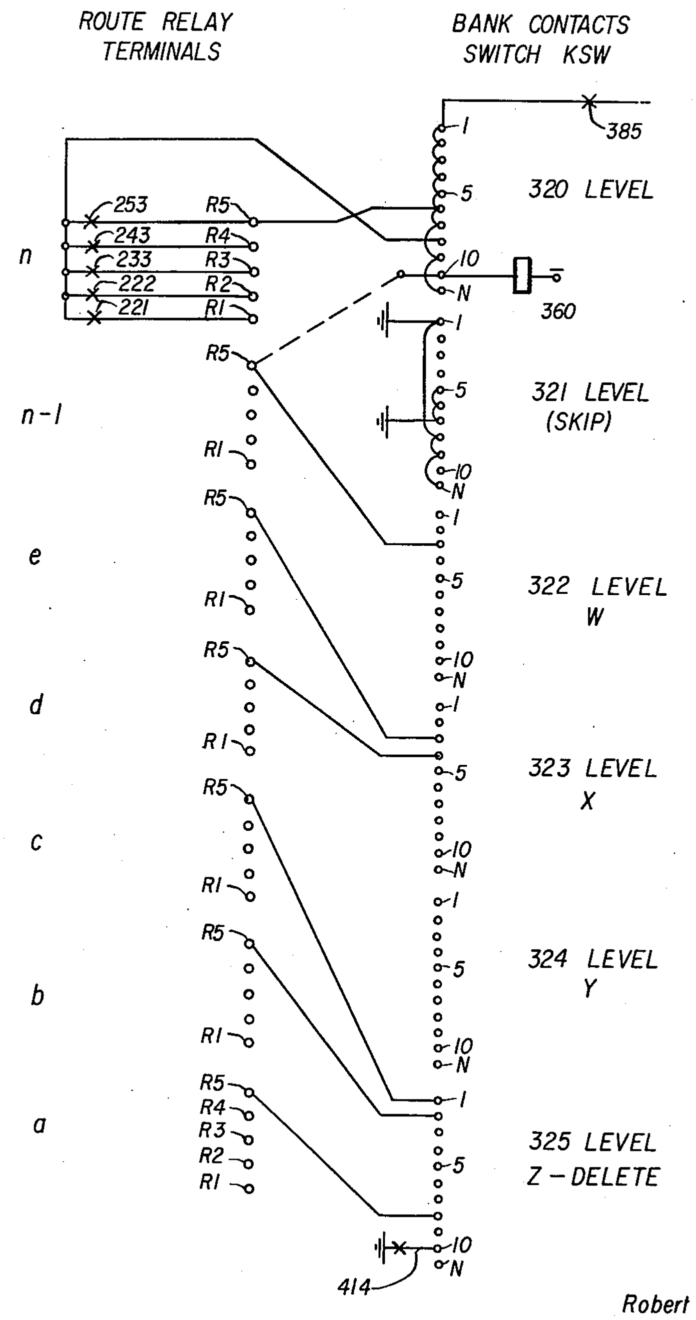

These and other features and objects will become apparent from a study of the drawings which include: FIG. 1 showing the invention schematically in a system; FIGS. 2, 3, and 4 showing a routing trunk in detail; FIGS. 5 and 6 showing a routing trunk sender in detail; FIG. 7 showing the contact bank wiring of the routing switch required for the fifth route and FIG. 8 showing the relationship of FIGS. 2–6.

Shown in FIG. 1 is a schematic representation to illustrate the use of the present invention in its most natural environment. This preferred usage includes a toll board 110 of any known type for initiating digital information for use in completing a toll call. A sender-finder 120 is placed at the service of the toll board and this finder finds an idle impulse sender 130. The digits as initiated are stored temporarily in the sender 130 for further transmission in controlling selective equipment. It should be noted that the use of any type of calling station which provides or requires preliminary digit storage could be used with no change in equipment.

Within the same exchange as the toll board is the remainder of the equipment shown in FIG. 1. These include switching equipment 140 which could be any of the required stages in a switch train leading to final toll selector 150. This toll selector includes a number of levels, each having connection to a specific separate exchange.

The first choices in each of these levels are the direct routes in which the digits as initiated are used in directly trunking a call to the desired exchange. The final choices on these levels are connected to overflow trunks such as 200 (shown in detail in FIGS. 2, 3, and 4) each of which serves five levels. Each routing trunk contains a sender-finder switch FSW having access to a number of routing senders 500 (shown in detail in FIGS. 5 and 6). The routing sender is responsive to the access path over which trunk 200 is seized to initiate the alternate routing digits for transmission through equipment shown as a square box 80 in FIG. 1 and in FIG. 4 to the tandem exchange. This equipment 80 may be a repeater, a trunk circuit, or any known equipment required.

In FIG. 2 is shown a series of input leads C10, C20, C30, C40, C50 each of which represents the (—) lead from one of the five selector levels. Leads C61, C62, and C63 each respectively represent the (+), EC and C leads multipled from all five levels to the trunk. The discriminating feature for determining the level over which the trunk 200 is seized is performed by the combined use of relays 210, 220, 230, 240, and 250, their contacts, the banks contacts of levels 320, 321, 322, 323, 324, and 325 of routing switch KSW and the cross-wiring of these contacts. Switch KSW is preferably an 11 point rotary switch of known design, the contact wiring of which will be explained in detail subsequently. The remainder of trunk 200 comprises relays of generally known type and switch FSW, the finder-sender switch. This rotary stepping switch is of generally known design and preferably of the 26-point type although any other number of contacts could readily be used. Contacts on this switch are connected to senders such as 500. Idle contacts are grounded so that as many senders are used as are necessary to provide a good grade of service.

The sender 500 of FIGS. 5 and 6 consists of a number of relays, rotary switches CS and SS, and impulse generator 580. Rotary switch CS, which is used to count digits initiated and deleted, is preferably an 11 point switch having four levels 655, 656, 657, and 658. It should be noted that the wipers of these levels are of the type using three wipers in the same plane, each displaced from one another by 120° to simulate the operation of a 33 point switch. Wipers for levels 655, 656, and 657 have two of the three wiper contactors clipped off so that these wipers constitute a single unit sweeping across this bank on only the first third of the switch cycle. Level 658 has one of the three wiper contactors clipped so that on this level, wiper-to-bank contact is maintained on the final two thirds of the switch cycle. Also, the switch off-normal springs operate only once for each complete cycle as may be seen more clearly in the detailed circuit operation.

Switch SS has two levels 665 and 666, and is used to translate digits from the generally known and used WXYZ code to a series of impulses. The function of this switch has been shown frequently and operates in conjunction with impulse generator 580. The generator consists of a motor 584 which is started by the operation of start relay 620 in the sender. The generator motor 584 rotates at a speed of 300 r.p.m. or 5 revolutions per second. Thus, by the use of two-ended lobe 583, ten pulses per second may be generated at contact sets 581 and 582.

The detailed operation of the routing trunk and sender is as follows:

*Seizure*

Ground over the (+) and (−) leads is transmitted to the trunk. It will be assumed throughout that route 5 using lead C50 as in input to trunk 200 is used. Thus, ground would be transmitted from the selector on lead C61 through contacts 362, and resistor 302 to the winding of relay 410, contacts 351, and resistor 305 to ground. Relay 410 operates over this path. Contacts 413 are closed, closing relay 420 from battery to C lead C63 and the ground on this lead in the selector 150. Relay 420 operates over this circuit. At closed contacts 421, ground is closed through the upper winding of relay 430, through contacts 331 and the CF lead to the subsequent equipment 80. The CF lead encounters battery at the idle equipment 80 leading to the tandem exchange. Equipment 80 and switching equipment in the tandem exchange are thereby seized. Relay 430 then operates. At contacts 425, relay 420 locks itself from battery to C lead C63 and its ground from the prior selector. At contacts 423, ground is placed on the traffic lead. It should be noted that routing trunk 200 sends back a ground on the EC lead C62 at all times maintaining this grounded condition during the seizure process. This ground at contacts 381 is transmitted through contacts 363 and 333 to provide the stop-dial signal to the selector and impulse sender 130. Thus, no digits can be removed from storage at impulse sender 130 until this ground is removed.

*Finding Idle Routing Sender*

Relay 430 operates over the previously described circuit. At contacts 431, the upper winding of relay 430 is shorted out over a path from ground through contacts 422, 431, and 331 to equipment 80 and battery. However, at its contacts 432, relay 430 has locked itself operated through its lower winding over a circuit from battery through the lower winding of 430, contacts 432, 334, and 423 to ground. At contacts 437, relay 440 is closed through contacts 426, 366, 337, and 343 to ground at ASB70. ASB70 ground is an all-sender-busy ground. This ground is normally provided and only is removed by the operation of a control relay (not shown) when all senders are found to be busy. Thus, if a busy condition prevails, relay 440 cannot operate and a busy signal will be sent back to the seizing equipment and the calling station or operator.

A sender is marked as idle to the searching trunk by an absence of ground on lead C485. Thus, if the wipers of sender-finder switch FSW are resting on contacts leading to a busy sender, ground appears on lead C485. This ground is connected by the operation of relay 440 to the motor magnet 455 of switch FSW over a path as follows: ground, lead C485, contacts and wiper of level 464, contacts 341, 441, interrupter springs 456, motor magnet 455 and battery.

Switch FSW, by having its interrupter contacts in the operating circuit to its motor magnet 455, steps self-interruptedly until an absence of ground appears signifying an idle sender. Assuming sender 500 of FIGS. 5 and 6 is idle and is the first sender accessible to switch FSW, absence of ground will appear on lead C485. With no ground on lead C485, relay 340 will operate over a circuit as follows: battery at motor magnet 455, interrupter springs 456, contacts 441, and the winding of relay 340 to ground at contacts 442. It will be recognized that this circuit was completed on the operation of relay 440 and closure of its contacts, but the ground from a busy sender on lead C485 effectively shunted out relay 340 from operation. With an idle sender and absence of ground, the resistance of relay 340 is enough to keep motor magnet 455 from operating while relay 340 does operate with the combined circuit resistance. Relay 340 opens its contacts 341 to open the lead C485 ground path from the sender and to transmit its own ground to the sender. At contacts 343, a locking ground is transmitted to the winding of relay 440 through contacts 337, 366, 426, and 437. At contacts 342, 346, 347, and 348; W, X, Y, and Z leads are closed from levels of routing switch KSW through the levels of the finder sender switch FSW to the sender and contacts on the levels of sender switch SS of FIG. 6. At contacts 344, ground is closed through the upper winding of relay 350, level 468 of switch FSW, lead C484 to relay 620 and battery. At contacts 345, which are now closed, ground is closed to relay 380 and battery.

Relay 350 operates over the previously mentioned path. At contacts 351, a circuit is closed to line relays 410 in the trunk circuit and 510 in the sender, which places these relays under the control of the calling party (−) lead C50. This circuit is completed from ground on lead C50 through contacts 265 and 361, resistor 301, relay 410, contacts 351, level 462 of FSW switch, lead C482 and resistor 501 to battery. At contacts 352 resistance battery is closed to the ECF lead to equipment 80. This resistance battery is transmitted through the upper winding of relay 515, on lead C481 and level 461 of FSW switch, contacts 352 to the ECF lead. At contacts 353 a resistance ground is transmitted to the (−F) lead trough a circuit from ground at contacts 616, resistor 502, non-inductive magnet 530, lead C483, level 463, contacts 353, resistor 303, contacts 361 and (−F) lead to subsequent equipment 80. This last-mentioned circuit also includes a circuit from ground at the lower set of contacts 588 through pulsing contacts 532, upper set of contacts 588, resistor 502 and non-inductive winding 530 to lead C483. This circuit is thereby prepared to outpulse digits to the subsequent equipment. Further, on operation of relay 350, ground is closed through closed contacts 354, 212, 222, 232, and 242 to relay 260 and battery. At contacts 357, a locking ground at contacts 345 is closed through contacts 357 and interrupter contacts 457 to the lower winding of relay 350 and battery.

Relay 260 then operates and opens its contacts 261, 262, 263, 264, and 265 removing the shunts across route relays 210, 220, 230, 240, and 250. As previously assumed, route 5 is the one being used for the call in progress and thus ground appears on the (−) lead to route 5, C50. This ground is transmitted through the winding of relay 250, contacts 361, resistor 301, relay 410, contacts 351, switch level 462, lead C482, resistor 501 and magnet 510 to battery.

Relay 250 then operates closing its contacts 251 to lock itself over a path from battery through closed contacts 251, 365, 335, and 424 to ground. At contacts 252 the operate path to relay 260 is opened. At contacts 253, 254, and 255 shown, ground and wiring leads are closed to the various contact levels of switch KSW. The function and necessary wiring of the contacts will be explained more fully later. Relay 260 then releases after the conclusion of its slow-to-release cycle.

*Seizure of the Sender*

The relays operated at this time are 250, 340, 350, 410, 420, 430, and 440.

Relay 380 which had previously been energized by the operation of relay 340 operates at the conclusion of its slow-to-operate cycle. At contacts 381 the stop-dial ground is transferred so that it is now supplied from contacts 412, through contacts 381, 363, 333 to EC lead C62. At contacts 382 a holding ground is closed through contacts 433, 334, 432 to the upper winding of relay 430 and battery.

Over a previously mentioned circuit including relay 410, line relay 520 operates. Also, over a described path from ground at 344, relays 350 and 620 have been closed. The effects of the operation of relay 350 have previously been described. Relay 620, the sender-start relay, then operates in series with relay 350. On operation of relay 620, contacts 627 close completing a circuit from battery through the lower winding of relay 560, interrupter contacts 653, contacts 627, lead C488, level 467, contacts 386, 356 to level 321 at its normal position and through the bank multiple to ground. At contacts 628 and 629 a circuit is closed to motor 584 of pulse generator 580 which then starts operating. The output pulses generated at contacts 582 remain shunted out by ground at closed contacts 616 so no effect is felt at this time. Relay 560 operates and prepares for the transmission of digits originated in the sender. Relay 560, it should be noted, is a fast-to-operate, slow-to-release relay due to its obvious upper winding circuit.

*Transmission of Digits*

As it has been assumed that the fifth route is the one being used, the interconnections for this route are shown in FIG. 7 and wiring necessary for any of the other routes would be in kind. A maximum of six routing digits may be originated in the trunk and as many as three deleted from the number transmitted from the operator or calling station. For purposes of explanation here, three routing digits will be originated in the trunk and three deleted from the called number. It will be assumed that the digits to be added for use in the tandem exchange will be 018 and the digits deleted will be 652 from a called number of 652–3456.

The cross-connections to perform this initiating and deletion are as follows: the 320 level of rotary switch KSW has its bank contacts 1—7, 9, and normal multipled to the KS terminal. This multiple is also connected to contacts 385 of FIG. 3. The multiple is also jumpered to the R5*n* terminal. The eighth bank contact of level 320 is connected directly to contacts 213, 223, 233, 243, and 253. The tenth bank contact on this level is connected to the switch-through relay 360 and SW terminal. SW terminal is used if no further digit input is expected after the conclusion of transmission of the routing digits, which situation occurs on ringdown trunks. In this instance the SW terminal would be connected to R5(*n*–1).

The 321 level is used as the "skip" level to skip the rotary switch across bank contacts which are to be idle. The first bank contact is not used for a digit to be initiated. Thus, the second bank contact represents the first routing digit. The first bank contact on the 321 level is grounded and this ground is normally multipled to the eighth, ninth, and normal contacts of level 321. Where, in the present instance, only three digits are to be initiated in the trunk, contacts 5, 6, and 7 are also grounded on the 321 level.

Levels 322, 323, 324, and 325 provide the respective W, X, Y, and Z markings by means of cross-connection to the route relay contacts which provide ground. Also, the 325 level provides deletion-of-digit marking. Thus, the first bank contact of level 325 is cross connected to the R5 terminal of the C group if one or three digits are to be deleted. To delete a second digit, the eighth contact of the 325 level is connected to the R5 terminal of the (*a*) group. The number of groups of terminals used or required is determined by the number of digits to be added and also those requiring deletion. It should be noted that only connections for the fifth route have been shown; those for the remaining four routes use the same method although different routing digits and deletions would be required for these routes.

The relays operated at this time include: 250, 340, 350, 380, 410, 420, 430, and 440 in the trunk; 510 and 620 in the sender. Relay 560 in the sender has just operated. At contacts 561, ground is closed to motor magnet 650 and battery. At contacts 564, relay 560 is given an alternate operate path from ground at contacts 626, through contacts 564, interrupter contacts 653 on the CS switch to the lower winding of relay 560 and battery. Ground at contacts 565 is closed through normal bank contact on level 658 of the CS switch to the level wiper and lead C487, level 466 of switch FSW, contacts 435, 355, wiper and normal bank contact of level 320, to contacts 385, motor magnet 310 and battery. Over the previously described circuits motor magnets 310 and 650 are energized simultaneously. Motor magnet 650, on being energized, opens its interrupter springs 653 opening the operate path to relay 560.

Release of relay 560 releases motor magnets 310 and 650 of switches KSW and CS respectively which allows these switches to step to their respective first bank contacts. On the 321 level of rotary switch KSW, ground is again transmitted to relay 560 over the previously described circuit. On the 325 level, due to the cross-connection to terminal R5*a*, the ground at contacts 255 is transmitted through the cross-connection to the first bank contact and wiper of level 325, contacts 348, level 473, lead CZ, level 656 (first bank contact) to relay 640 and battery. Relay 640 operates and at contacts 641 locks itself to the multiple hold ground at contacts 624.

Relay 560 operates, then releases as described previously, and switches CS and KSW each take another step. When switch CS is resting on its second bank contact, at level 655 a circuit is closed to relay 615 as follows: from ground at contacts 624, through the wiper and second bank contact of level 655, contacts 516, 581, 545, 618, 562, 546, 524, and relay 615 to battery. Relay 615 then operates.

At this time relay 560 has been released, and since no ground appears on the second bank contact of level 321 (the skip level), relay 560 cannot re-operate. Contacts 618 close when relay 615 operates and these contacts shift the operate path of this relay to the multiple hold ground at contacts 624. This shifted path is from ground at 624 through contacts 618, 562, 546, 524 to relay 615 and battery. At contacts 619, a complete path is closed from battery at motor magnet 660 of switch SS through closed contacts 619, pulsing contacts 581 to the multiple hold ground at contacts 624. At contacts 616 now open, a ground shunt is removed from pulsing contacts 582.

On removal of the 616 shunt, ground pulses at the rate of ten pulses per second are transmitted to the subsequent equipment 80 and also are used to step the SS switch to control the number of outpulses sent. The outpulsing circuit is as follows: ground at closed contacts 588, pulsing contacts 582, contacts 588, resistor 502, non-inductive winding 530, lead C483, level 463, contacts 353, then dually over a path through resistor 304 to the (+F) lead to subsequent equipment 80 and also through resistor 303 and contacts 361 to (—F) lead to equipment 80.

Switch SS steps under the control of the generated pulses at the rate of ten pulses per second until simultaneously marked bank contacts are found by both its wipers. Since the first digit to be transmitted is 0 as indicated by Z in the WXYZ code, switch SS will have to step to its tenth bank contact to find simultaneous ground on both its levels. When the tenth contact is reached, a circuit is closed from battery, through the B winding of relay 670 over the wiper to the tenth bank contact of level 666 to ground. The A winding of relay 670 is closed from battery to the wiper and tenth bank contact of level 665, contacts 529, lead CZ, level 473, contacts 348, level 325, bank contact Z2, terminal R5*a*, contacts 255, and ground. Relay 670 then operates since its windings are both energized in opposition. Relay 670 closes its contacts 671, which then close relay 540 over a circuit from battery through lower winding of relay 540, contacts 522, 671, 617, and 624 to ground.

Relay 540 closes its contacts 541 to provide a ground shunt for the outpulsing contacts 582. Thus, only ten pulses are transmitted to designate the first outpulsed digit of 0.

*Interdigital Pause*

Relay 540 by its operation initiates the interdigital pause cycle. At contacts 544, relay 520 is shunted out and the operate path for relay 540 is shifted. This shifted path is as follows: battery, lower winding of relay 540, contacts 522, 523, 544, off-normal springs 661 to ground at contacts 624. At contacts 546 the operating circuit to relay 615 is opened. At contacts 547, an alternate operating path is closed from ground at contacts 626 through contacts 525 to the lower winding of relay 560. Relay 615 restores its contacts 619, closing battery at motor magnet 660 of SS switch through its own interrupter springs 662 and off-normal springs 663 to ground. Motor magnet 660 then steps self-interruptedly back to its normal or home position. When the SS switch returns to its normal position, its off-normal springs 661 and 663 open. At contacts 661, the locking circuit to relay 540 and the shunt across relay 520 are both opened. At contacts 663, the homing circuit to motor magnet 660 and the operating circuit of relay 670 are both opened.

Relay 560 reoperates and recloses the circuits to motor magnets 310 and 650 which both operate at this time. Relay 670 restores.

Once the shunt across relay 520 has been removed, this relay operates in series with relay 540. This operating circuit leads from battery through the lower winding of relay 540, lower winding of relay 520, contacts 542 and 624 to ground. Relay 520, by operating its contacts 527 and 529, places ground on the fourth, fifth, eighth, and tenth contacts of bank level 665 and the third, fifth, and sixth bank contacts of level 666. Contacts 525 are opened in the hold path to relay 560. A further shunt across the outpulsing contacts is closed at contacts 521. Relay 560 restores at the conclusion of its slow-to-release period causing switches CS and KSW to stop to their third bank contacts. Contacts 562 close the operate path to relay 615. This operating path includes battery at relay 615, closed contacts 524, 546, 562, 618, 545, and 624 to ground. Relay 615 locks itself to this ground at contacts 618 which close. At contacts 619, motor magnet 660 is placed under the control of the pulse generator contacts 581. Switch SS then steps until a ground is found simultaneously on the 665 and 666 levels of rotary switch SS. On the fifth contact of the levels of switch SS, the simultaneous grounds from contacts 527 and 529 respectively cause shunt field relay to operate to stop switch SS from stepping further. This stepping of switch SS to the fifth step simulates an interdigital pause. During this interdigital period, ground at both contacts 521 and 541 shunt out the ground pulses from pulsing contacts 582 so no outpulsing occurs to the succeeding equipment.

When relay 670 operates with relay 520 already operated, the hold path to relay 540 is opened at contacts 671 causing relay 540 to restore. At contacts 545 and 546 the operate path to relay 615 is opened causing this relay to restore. Restoration of relay 615 closes contacts 619 in the homing circuit of SS switch. Motor magnet 660 then steps switch SS to the home position. Off-normal springs 661 then open the operate path to relay 520 which then restores and recloses the operating path to relay 615.

Further, digits as required are transmitted in the same manner. These would include, for the assumed route, one as the second digit and eight as a third digit each followed by an interdigital pause. In this manner switches KSW and CS would then have their wipers resting on their respective fifth bank contacts. On the fifth, sixth, and seventh contacts of level 321 of switch KSW, ground straps have been provided as shown in FIG. 7. This ground at the bank contacts of level 321 is transmitted through contacts 356, 386, level 467 of switch FSW, lead C488, contacts 627, and interrupter contacts 653 to relay 560 and battery. Relay 560, as a fast-operating relay, operates quickly and opens its contacts 562 so relay 615 cannot operate. At contacts 561 and 565 ground is closed energizing motor magnets 650 and 310. Motor magnet 650, on being energized, opens its interrupter springs 653 causing relay 560 to release and the switches CS and KSW step to the next bank contact.

The switches continue stepping in the same manner since ground appears on the bank contacts of the skip level 321 operating the digit control relay 560 to cause KSW and CS switches to step. While the switches have paused on their eighth bank contact awaiting the release of the slow-to-release digit control relay 560, a ground from the eighth contact of the 325 level is transmitted through the wiper of this level and contacts 348, level 473 of switch FSW and lead CZ, to level 656 of switch CS and through the eighth bank contact to relay 630 and battery. Relay 630 operates and locks itself over its upper winding to the multiple hold ground at contacts 624. Operation of relay 630 signifies that a second digit of those transmitted from the calling station or operator will be deleted. This is in addition to relay 640 which shows that a a first transmitted digit is to be deleted. The combined operation of both relay 630 and 640 signifies that a total of three digits are to be deleted from those received.

After its slow-to-release period, relay 560 releases and continues its cyclic operation and release thus stepping switches KSW and CS to their tenth bank contacts.

At this time, three digits 0, 1, and 8 have been generated as series of impulses in the sender and transmitted, notice has been given the sender that three digits from the call initiator are to be absorbed, and no digits as yet have been received from the call initiator.

*Absorption of Digits*

Of major interest in the deletion of digits is the status of bank contacts on levels 657 and 658. If no digits are to be deleted, no cross-connections are made from the first and eighth bank contacts of level 325 of switch KSW to the ground at the routing relay contacts. If no ground is provided, relays 630 and 640 cannot operate. If relays 630 and 640 have not operated, then a ground at contacts 633 is transmitted through contacts 643, tenth bank contact of level 657, the level wiper, lead C487, level 466, contacts 435, 355, wiper and tenth bank contact of level 320 to relay 360 and battery. Thus, when switches KSW and CS have their wipers resting on the tenth bank contact, relay 360 switches the connection through to the tandem exchange and the function of the alternate routing trunk sender is completed.

If a single digit is to be deleted from the called number, a single cross strap from the first bank contact on level 325 to the trunk access route contact ground, shown in FIG. 7 as R5C is provided. This ground causes relay 640 to operate. Relay 640, on operation removes the ground from the tenth step of level 657. Instead, a ground is placed on the first bank contact of level 658. Level 658 has only two wipers and does not reach the bank contacts until switch CS has taken its twelfth step, and thus the ground at contacts 633, as now connected to the first bank contact, is in effect on the twelfth sequential bank contact.

If two digits are to be deleted, a cross strapping is made from the eighth contact of level 325 to terminal R5*a* as shown in FIG. 7. The cross-strap from the first bank contact of this level is omitted. Thus, only relay 630 operates during the first ten steps taken by rotary switch CS. Relay 630, on operation, places a ground on the second bank contact of level 658 which is, in effect, the thirteenth sequential bank contact of level 658.

If three digits are to be deleted, both straps are provided. Relays 630 and 640 both will have operated by the tenth step of the CS switch.

By the point operation of relays 630 and 640, ground is removed from the tenth, twelfth, and thirteenth bank contacts as connected to lead 487. A direct ground then appears on the fourteenth contact (third contact of level 158) to initiate the switch-through function. It is the three digit deletion or absorption which will be explained in detail.

Operated at this time are relays 250, 340, 350, 380, 410, 420, 430, and 440 in the trunk circuit and relays 510, 620, 630, and 640 in the sender. Switches KSW and CS have their wipers resting on their respective tenth bank contacts and switch SS is at normal.

A circuit is completed to motor magnet 650 as follows: battery, motor magnet 650, contacts 642, tenth bank contact of level 656 and the level wiper, lead CZ, level 473 of switch FSW, contacts 348, level 325 wiper and tenth bank contact to ground at contacts 414. Motor magnet 650 is thereby energized closing its interrupter contacts 652. At contacts 652 an alternate operating path to relay 510 is completed as follows: ground at contacts 624, to wiper of level 655, the tenth bank contact, interrupter contacts 652 and relay 510 to battery. Relay 510 had previously received its operating ground in series with relay 410, but now relay 410 is shunted out and releases. At contacts 412, the stop-dial condition is removed from lead C62, the incoming EC lead. Contacts 414 open, removing the operate ground to motor magnet 650. Motor magnet 650 is thereby deenergized and switch CS alone takes its eleventh step. Ground impulses are sent into the trunk circuit on (−) lead C50, through contacts 265, 361, resistor 301, contacts 422, 411, 351, over level 462 and lead C482 to relay 510 and battery. Also, these pulses appear on (+) lead C61 and are transmitted through contacts 362 and resistor 302 to contacts 422 and the previously mentioned path to relay 510.

Relay 510 follows these pulses alternately making and breaking its contacts 511. On the first restoration of relay 510, a circuit is closed from battery at relay 550 through contacts 511 and off-normal contacts 651 to ground. Relay 550 operates and, being slow-to-release, remains operated during the pulsing of relay 510. At contacts 553, motor magnet 650 is maintained operated from ground at contacts 624. Relay 550 releases during the interdigital pause and allows motor magnet 650 to step switch CS to its twelfth bank contact.

Motor magnet 650 is then energized by the second operation of relay 550 during the transmission of the second series of impulses to relay 510. Relay 550 and motor magnet 650 respond to each series of impulses until three digits have been absorbed. Motor magnet 650 has then just reached its fourteenth contact shown as the third bank contact of level 658. The direct ground on this contact is transmitted on lead 487 through level 466 of switch FSW, contacts 435, 355, wiper and tenth bank contact of level 320 to relay 360 and battery.

*Switch-Through and Sender Release*

Relay 360 operates switching the (+) and (−) leads through contacts 361 and 362 to the succeeding equipment 80. At contacts 363, the EC lead C62 is switched through to the ECF lead to equipment 80. At contacts 365, relay 360 locks itself from battery through contacts 335 and 424 to ground. Further, at contacts 365, the operating circuit to relay 250 is opened. At contacts 364, a further locking ground is closed through contacts 433, 334, and 432 to relay 430 and battery. At contacts 366, the operating circuit to relay 440 is opened.

Relay 440 restores, opening its contacts 442 in the operating circuit of relay 340 which then also restores. Meanwhile, relay 510 has restored after contacts 361 and 362 were switched-through and opened the pulsing path to relay 510. Relay 550 operates and remains operated after relay 510 has restored.

Relay 340, on restoration removes ground at contacts 344 and 345 from relays 350, 380, and 620. Also, contacts 342, 346, 347, and 348 open various circuits through the levels of switch FSW to the sender.

Relay 250 restores, removing its ground from the terminals cross-connected to the bank contacts of switch KSW. Prior to the release of relay 350, relay 260 is operated momentarily over its previously described operating circuit.

In the sender, relay 620 has restored, opening relays 630 and 640 which also restore. Relay 560 then operates over a circuit including interrupter springs 653, contacts 627, and off-normal springs 654 to ground. At contacts 561, motor magnet 650 is energized and opens its interrupter contacts 653, opening relay 560. Relay 560 and motor magnet 650 cooperate to step switch CS back to normal. When the CS switch reaches normal, it opens this circuit to relays 550 and 560 which then restore.

Relays 350, 380, and 260 restore, opening their numerous contacts. After relay 380 has restored, a homing circuit for KSW switch is closed. This circuit includes: battery, motor magnet 310, contacts 385, interrupter contacts 313, off-normal contacts 312 and ground. The switch returns to normal and stops there.

The sender has now been completely released and relays 360, 420, and 430 in the trunk remain operated during the pendency of the call.

When the operator disconnects at the conclusion of the call, ground is removed from the C lead C63 which opens relay 420. Relay 420 restores, opening relays 350 and 430 which then restore removing ground from the CF lead. Removal of this ground releases the subsequent equipment 80.

*Timing Alarm*

When the sender is seized by the routing trunk, as previously described, relay 620 operates. On operation, contacts 621 close thereby grounding the start lead, and contacts 622 close the primary timer relay 610 to Time lead 1. The purpose of these timing leads and relays 570 and 610 is to time the functioning of the sender circuit. Operation of start relay 620 and the subsequent grounding of the start lead initiate a timing sequence. After a specified time period, which can be controlled in any known manner, a ground pulse appears on the lead Time 1. Relay 610 then will operate and lock itself at its closed contacts 612 to the multiple holding ground in the sender at contacts 624. After a second time period, which preferredly is in the two to four minute range, a ground pulse from the timer (not shown) appears on lead Time 2. Relay 570 then operates and at contacts 574 closes trouble lamp 591 to the 120 impulses per minute lead, and at contacts 572 relay 570 locks itself to the multiple hold ground at contacts 624. At 575, ground is sent back on lead C486, through level 465 and closed contacts 384 to relay 330 and battery. At contacts 573 relay 620 is locked through release key 509 to ground at contacts 624.

Relay 330 operates, initiating a number of operations. At contacts 331, the circuit through lead CF to succeeding equipment 80 is opening, releasing the equipment held there. Ground at contacts 332 is closed through contacts 434 and interrupter contacts 456 to motor magnet 455 and battery. At contacts 333, the 120 impulse per minute lead is closed to the EC lead C62. At contacts 334, the hold path of slow-to-release relay 430 is opened. At 335, the hold path of relay 250 is opened. Also at contacts 335, relay 330 locks itself from battery through contacts 424 to ground. At contacts 337, ground is removed from the operate path of relay 440.

Motor magnet 455 opens its interrupter contacts 456, causing switch FSW to step to its next bank contacts leading to the next available sender. This then opens all the leads from the routing trunk to the sender. In the sender, relays 570, 610, and 620 remain operated thus grounding the sender to all routing trunks and maintaining a permanent alarm. Manual restoration of release key 509 is required to restore relay 620 and release the sender.

The routing trunk continues its partial releasing by sequentially restoring relays 440, 250, 260, 340, 430, and 350. Switch KSW homes itself after relay 380 restores. Relays 330 and 420 remain operated until the calling station disconnects.

The purpose of the timing function is to allow the sender a time period after seizure to complete its normal operation and release, and if this release does not occur, it is probable that any trouble occurring will have its origin in the sender. Thus, the sender remains locked busy until released manually. It is also most probable that any digits transmitted have been mutilated so that a complete new connection is preferable.

*Subsequent Stop-Dial*

If succeeding equipment 80 returns a stop-dial indication to the trunk circuit 200, this indication is received over the ECF lead. If this occurs before relay 360 has switched-through, this stop-dial ground is then transmitted through contacts 352, lead 461, and lead C481 to relay 515 and battery. Relay 515 operates and opens its contacts 516 in the operate path to relay 615 which then cannot operate and motor magnet 660 cannot be stepped. When the stop-dial ground is removed, relay 515 restores and the circuit functioning continues.

If a stop-dial signal is received by the routing trunk 200 from subsequent equipment 80 after switching-through as evidenced by the operation of relay 360, the ground is transmitted through contacts 363 to the input EC lead C62 to hold up the prior equipment.

Further, it should be noted that all forms of traffic study meters and supervisory equipment may be added to the circuits disclosed with but minor obvious changes.

What is claimed is:

1. In a telephone system having a plurality of exchanges, means for initiating pulsed digital information for completing a call from a first to a second of said exchanges, means for routing said call over an alternate path through another of said exchanges in tandem comprising: means for stopping the transmission of said initiated digital information upon seizure of said routing means, means for forming and transmitting digits comprising sequences of impulses for routing said call through said other exchange to said second exchange automatically in response to the path of seizure of said alternate routing means, means for thereafter deleting a number of digits from said initiated digital information and for thereafter completely switching said call from said first to said other exchange to allow the remainder of said initiated digital information to be transmitted to thereby cause said call to be completed from said first to said second exchange.

2. In a telephone system having a plurality of exchanges and trunks therebetween, a first exchange, switching equipment at said first exchange for extending calls to trunks to said other exchanges individually in response to pulsed digital information initiated at said first exchange, a second exchange having trunk lines for tandem connection from said first to other of said exchanges, alternate routing means at said first exchange for use in establishing the connection from said first to said other exchange comprising: means operated on seizure for halting the transmission of said initiated digital information, means for seizing a trunk to said second exchange and transmitting pulsed digits for use in said second exchange dependent on the identity of the called exchange, means for thereafter removing said halting of initiated digital information and absorbing digits not required by said second exchange, and means for switching said first exchange directly through to the trunk to said second exchange to continue the transmission of pulsed digits therethrough.

3. In a telephone system, switching equipment operated in response to initiated pulsed digits to extend connections to a plurality of output paths, an alternate routing trunk circuit seizable over one of said output paths, said trunk circuit comprising means in said trunk for determining the output path over which seized, and means operated on seizure for emitting a stop-dial signal over said seizure path, a plurality of senders, means in said trunk circuit for finding an idle sender, means in said found sender for causing said stop-dial signal to be maintained, means in said sender responsive to the determination of the trunk circuit seizure path for initiating routing pulsed digits for transmission, means in said trunk circuit operative on completion of the transmission of said routing digits for removing said stop-dial signal, means in said sender for absorbing one or more of said originally initiated digits under the control of the determination of the seizing path to said trunk circuits, and means in said sender operative thereafter for switching said seizing path through the output circuit for completion of transmission of pulsed digits.

4. In a telephone system as claimed in claim 3, said digit absorbing means comprising a first relay, a second relay and a stepping switch, said first relay responsive to received pulses of a digit to be deleted, said second relay operated once by said first relay for each digit to be absorbed, means for placing a ground on the contact of said stepping switch corresponding to the number of digits to be absorbed, said stepping switch controlled by each operation of said second relay to step once accordingly, means responsive to said switch reaching said grounded contact for causing said switching-through means to function.

5. In a telephone system having means for initiating a plurality of pulsed digits for completing a connection to a called party, means for storing these digits prior to transmission, means for controlling the alternate routing of said connection, said routing control means accessible from a plurality of access paths and comprising: access path identifying means, means operated on seizure of said routing means for maintaining a stop digit transmission signal back to the access path over which seized, means controlled by the identifying means for initiating a set of alternate routing pulsed digits, means for transmitting said set of alternate routing digits to an output circuit, means responsive to completion of transmission of said routing digits for removing said stop transmission signal, further means controlled by said identifying means for deleting a predetermined number of digits from said plurality of digits, and means responsive to the completion of the absorption of said predetermined number of digits for extending the connection from the routing means over said output path.

6. In a system as claimed in claim 5, said stop digit transmission means comprising a first relay operated on seizure of said routing means, said further means comprising a second relay operated in series with said first relay, said removing stop digit transmission means comprising means for shunting down said first relay, said second relay thereby positioned to receive transmitted digits in the form of a series of impulses, said second relay responsive to said impulses to thereby operate and release, a third relay controlled by the operation of said second relay to operate once on each digit received by said second relay, and counting means controlled by the operation of said third relay to initiate the connection extending means.

References Cited in the file of this patent

UNITED STATES PATENTS

| | | |
|---|---|---|
| 2,385,228 | Ostline | Sept. 18, 1943 |
| 2,397,829 | Avery | Apr. 2, 1946 |
| 2,631,195 | Ostline | Mar. 10, 1953 |
| 2,857,467 | Molnar | Oct. 21, 1958 |
| 2,938,960 | Harris | May 31, 1960 |